Sept. 26, 1939. C. D. QUANTZ Re. 21,219

TWO-CYCLE ENGINE

Original Filed March 20, 1936 2 Sheets-Sheet 1

INVENTOR

Calvin D. Quantz

Sept. 26, 1939. C. D. QUANTZ Re. 21,219
TWO-CYCLE ENGINE
Original Filed March 20, 1936 2 Sheets-Sheet 2
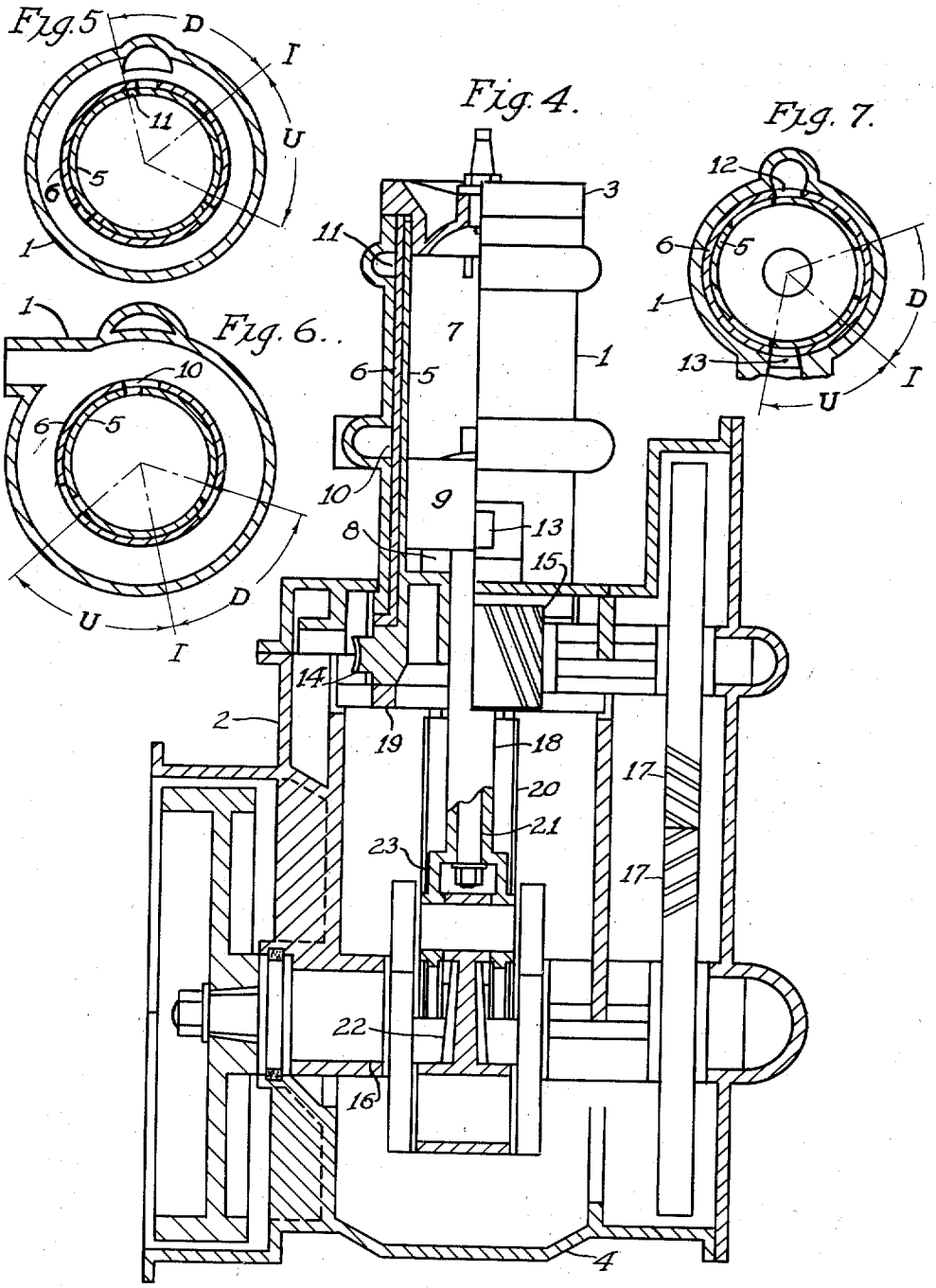
INVENTOR
Calvin D. Quantz Reissued Sept. 26, 1939

Re. 21,219

UNITED STATES PATENT OFFICE 21,219

TWO-CYCLE ENGINE

Calvin D. Quantz, Detroit, Mich.

Original No. 2,061,439, dated November 17, 1936, Serial No. 69,968, March 20, 1936. Application for reissue October 21, 1938, Serial No. 236,306

3 Claims. (Cl. 123—74)

My invention relates to two-cycle internal combustion engine constructions of the rotary sleeve valve type.

The primary object of my invention is to provide a more efficient and economical two-cycle engine.

Another object is to provide in such an engine having a rotary valve structure consisting of two concentric sleeves, one stationary and the other revolving therewithin, an improved compression chamber, formed in the rotary sleeve beneath the piston and connected to inlet ports located above the piston, the crankcase being relieved of compression pressure and said sleeves having properly spaced slots which form port holes for the intake and exhaust of gases when corresponding slots of one coincide with those of the other.

I attain the foregoing and other objects which will become apparent during the course of the following description by mechanism illustrated in the accompanying drawings, in which:

Figure 4 is a vertical longitudinal sectional view of the engine.

Figure 1:
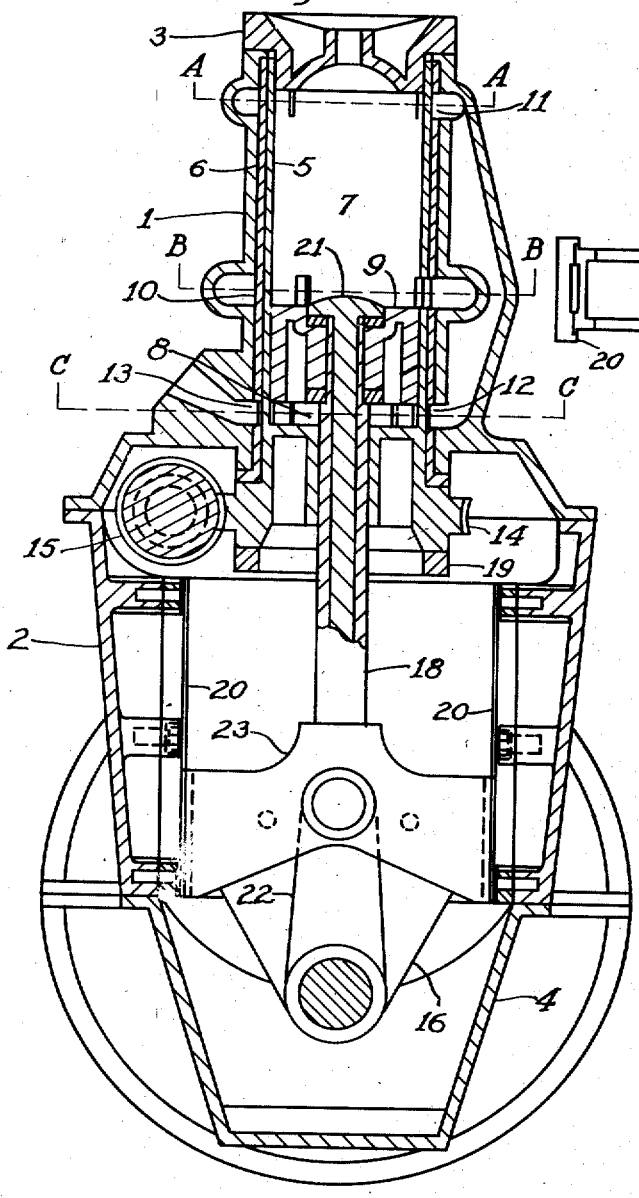
Figure 1 is a transverse vertical sectional view of an engine incorporating the principles of the invention.
Figure 2:
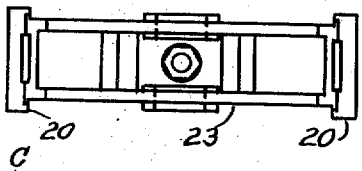
Figure 2 is a bottom plan view of the crosshead and crosshead guides.
Figure 3:
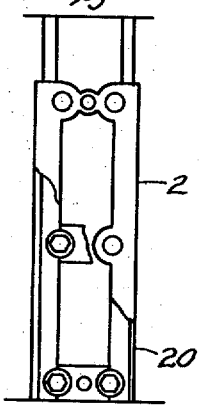
Figure 3 is a fragmentary elevational view of one of the crosshead guides, showing the manner in which the same is fastened to the crankcase.

Figures 5, 6 and 7 are sectional views taken substantially on the lines A—A, B—B and C—C respectively of Figure 1, illustrating the purpose of the cylinder sleeves and the relative positions of the three groups of slots therein, Figure 5 showing slots which form the intake ports in the combustion chamber, Figure 6 showing slots which form the exhaust ports in the combustion chamber, Figure 7 showing slots which form the intake and fuel transmitting ports in the auxiliary intake chamber. Like characters denote like and corresponding parts throughout the several views in which:

The reference numeral 1 indicates the cylinder-block, to which is fastened the crank case 2, with cylinder head 3 and oil-pan 4, fastened in their respective places to constitute the body and frame work of the engine.

The rotary-sleeve valve consists of two cylinder sleeves having properly spaced slots forming port-holes for the intake and exhaust of gases when corresponding slots of the inner revolving sleeve 5 concide with those of the stationary sleeve 6. The said slots are so timed as to promote a more efficient combustion and also a more thorough scavenging of burnt gases. Combustion in the combustion chamber 7 and compression of fresh fuel gas in the charging chamber 8 occur during the downstroke of the piston 9. As the piston 9 nears the lower end of stroke, the slots forming the exhaust ports 10 start opening a moment before the opening of the slots forming the intake ports 11 of the combustion chamber 7 thereby neutralizing the pressure within the combustion chamber 7, before the compressed fuel gases enter forcing the remaining burnt gases out. In this manner there will be a minimum amount of burnt gas mixed with the fresh gas. Slots forming the charging chamber outlet port 12 open a moment before those of the intake ports 11, thereby allowing instantaneous entrance of fresh gas. When the piston reaches bottom dead center the slots forming the intake port 13 of the charging chamber 8 start opening, while those forming the outlet port 12 and intake ports 11 close. The exhaust ports 10 remain open a moment past bottom dead center. On the up-stroke of the piston 9, fresh fuel is drawn by vacuum from the carbureter via intake port 13 into the charging chamber 8. When piston 9 reaches top dead center the intake port 13 is closed thus completing the two cycles.

The stationary sleeve 6 is inserted and fastened to the cylinder block 1. This sleeve is for a more accurate timing of slots.

The revolving sleeve 5 has a worm gear 14 at the base, and is one piece with said gear. The worm gear 14 is meshed and driven by a worm shaft 15, which in turn is driven by the crank shaft 16, through the medium of gearing 17, 17 as illustrated, or any suitable means. The above named gears are so arranged that they reduce the speed of the revolving sleeve 5 to a "three to one" ratio which I find gives the best results. The revolving sleeve 5 has its base inclosed by a web (undesignated) except for a hole for the insertion of the connecting rod 18 forming an inclosed air-tight chamber with said connecting rod inserted. The revolving sleeve 5 rests upon a bearing plate 19.

The connecting rod 18 is held to center by means of a crosshead 23 which reciprocates in ways 20, 20. The piston 9 is fastened to the connecting rod 18 by means of a draw bolt 21.

The pitman 22 operates in conjunction with the crank-shaft 16 and connecting rod 18.

In Figures 5, 6 and 7, the letter "I" represents the theoretical point of ignition, the letter "D" represents the distance the sleeve revolves in the down-stroke of the piston and the letter "U" represents the distance the sleeve revolves in the up stroke of the piston.

From the foregoing description and illustrations the advantages and original features of my invention are believed readily apparent.

I desire it to be understood that I may make changes in design and construction and in the combination and arrangement of the several parts, provided that such changes fall within the scope of the appended claims.

I am aware that prior to my application rotary sleeve valves had been applied to two-cycle engines. I therefore do not claim such a combination broadly; but

I claim:

1. In the combination of a two-cycle engine, a crank case, a cylinder block mounted on the crank case, a rotary sleeve valve operating within said cylinder block, said sleeve valve consisting of a pair of cylinder sleeves, one sleeve being stationary, the other revolving within the stationary sleeve, said revolving sleeve having an inclosed base except for a hole for the insertion of the connecting rod, a vertically reciprocating connecting rod passing through said hole, said hole being air tight when the said connecting rod is inserted therein, thus preventing fuel leakage from the charging chamber, a piston fastened to the connecting rod, said piston operating within the revolving cylinder sleeve, said piston in the cylinder forming two chambers therein, a combustion chamber above said piston, a charging chamber below, the charging chamber formed between the piston and the inclosed base of the revolving sleeve, annular slots in the upper end of said sleeve to control the inlet ports of combustion chamber, annular slots in said sleeve at the lower end of the combustion chamber to control the exhaust ports for said chamber, the slots of the revolving sleeve for the charging chamber being annularly spaced to correspond with said inlet and exhaust ports of the combustion chamber, said slots serving a dual purpose by controlling inlet and outlet ports in the charging chamber, said stationary sleeve having the inlet and exhaust slots for the combustion chamber annularly spaced to correspond with those slots of said revolving sleeve, the said stationary sleeve having a pair of oppositely spaced slots forming inlet and outlet ports in the charging chamber when coinciding with those slots of the revolving sleeve.

2. A two-cycle internal combustion engine having a cylinder structure and a piston reciprocable therein, a cylindrical sleeve valve concentric with and forming a part of the cylinder structure and extending below the inner end of the stroke of the piston, a substantially cylindrical connecting rod rigidly connected to the piston and reciprocable in a rectilinear path therewith, a web carried by the valve and extending across the cylinder structure below the inner end of the stroke of the piston, said web enclosing a charging chamber beneath the piston and being in slidable and substantially sealed engagement with the piston rod, means including a passage controlled by said valve for providing communication between said charging chamber and the space above the piston, means for rotating the valve in timed relation to the movement of the piston, and means also controlled by said valve for admitting fuel to said charging chamber and for allowing burnt gases to escape from said space above the piston.

3. A two-cycle internal combustion engine having a cylinder structure comprising a pair of concentric sleeves, one rotatable within the other, a piston reciprocable in the inner sleeve, valve ports in said sleeves for controlling admission and discharge of fluid into and from the cylinder structure both above and below the piston, a casing surrounding the outer of said sleeves and having an intake passage therein below the piston and an exhaust passage above the piston, said casing also having a transfer passage therein connecting an exhaust port below the piston with an intake port above the piston, means substantially sealing the space above and the space below the piston to form a combustion chamber above and a compression chamber below the piston, and means for rotating one sleeve with respect to the other in timed relation to the travel of the piston.

CALVIN D. QUANTZ.